(12) United States Patent
Voetter (10) Patent No.: US 10,753,074 B2
(45) Date of Patent: Aug. 25, 2020

(54) LAVATORY FOR A VEHICLE AS WELL AS A VEHICLE HAVING SUCH A LAVATORY

(71) Applicant: Airbus Operations GmbH, Hamburg (DE)

(72) Inventor: Axel Voetter, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 15/785,025

(22) Filed: Oct. 16, 2017

(65) Prior Publication Data

US 2018/0112382 A1    Apr. 26, 2018

(30) Foreign Application Priority Data

Oct. 21, 2016   (DE) .................... 10 2016 120 121

(51) Int. Cl.
| | |
|---|---|
| *B64D 11/02* | (2006.01) |
| *E03C 1/324* | (2006.01) |
| *A47K 3/022* | (2006.01) |
| *A47K 13/24* | (2006.01) |
| *E03C 1/14* | (2006.01) |

(52) U.S. Cl.
CPC ............. *E03C 1/324* (2013.01); *A47K 3/022* (2013.01); *A47K 13/24* (2013.01); *B64D 11/02* (2013.01); *E03C 1/14* (2013.01)

(58) Field of Classification Search
CPC .......... A47K 1/04; A47K 3/022; A47K 3/062; A47K 5/18; B64D 11/007; B64D 11/02; B64D 11/04; E03C 1/01; E03C 2001/0417; E03C 2001/90

USPC .............................................. 4/524–536, 664
See application file for complete search history.

(56) References Cited

U.S. PATENT DOCUMENTS

| | | | | | |
|---|---|---|---|---|---|
| 1,616,313 | A | * | 2/1927 | Farmer .................... | E03C 1/01 4/615 |
| 2,641,771 | A | * | 6/1953 | Schiro .................... | A47K 3/022 134/199 |
| 4,201,415 | A | * | 5/1980 | Suchanek .............. | B60K 11/00 180/68.1 |
| D296,128 | S | * | 6/1988 | Davis .......................... | D23/271 |
| 6,611,972 | B2 | * | 9/2003 | Underbrink .............. | A47K 1/02 4/619 |
| 7,014,148 | B2 | * | 3/2006 | Dominguez .......... | B64C 1/1469 244/118.5 |
| 7,364,119 | B2 | | 4/2008 | Sprenger et al. | |
| 8,424,130 | B2 | * | 4/2013 | Dannenberg ........... | B64D 11/02 4/316 |

(Continued)

FOREIGN PATENT DOCUMENTS

| | | |
|---|---|---|
| DE | 102013224936 A1 | 6/2015 |
| DE | 102014110808 A1 | 2/2016 |

(Continued)

*Primary Examiner* — David P Angwin
*Assistant Examiner* — Nicholas A Ros
(74) *Attorney, Agent, or Firm* — Lerner, David, Littenberg, Krumholz & Mentlik, LLP (57) ABSTRACT

A lavatory for a vehicle includes a housing that is accessible through an access opening, and a washing apparatus for washing feet. The washing apparatus includes a water supply device and a water removal device. The washing apparatus also includes a depression, with which the water removal device is couplable and which is positionable underneath the water supply device. The depression has a use height, which is 700 mm at a maximum.

17 Claims, 9 Drawing Sheets

(56) References Cited

U.S. PATENT DOCUMENTS

| | | | | |
|---|---|---|---|---|
| 8,544,795 B2 | * | 10/2013 | Guering | B64D 11/00 244/118.5 |
| 9,187,882 B2 | * | 11/2015 | Masoud | A47K 3/022 |
| 2009/0030355 A1 | | 1/2009 | Gay | |
| 2013/0055500 A1 | * | 3/2013 | Fakhro | A61H 35/006 4/639 |
| 2015/0052676 A1 | * | 2/2015 | Azmi | A61H 33/6021 4/622 |
| 2015/0166180 A1 | * | 6/2015 | Schliwa | B61D 35/005 244/118.5 |
| 2015/0335526 A1 | * | 11/2015 | Lee | A61H 33/06 4/524 |

FOREIGN PATENT DOCUMENTS

| | | | | |
|---|---|---|---|---|
| JP | 0615411 | * | 6/1994 | A47K 1/02 |
| JP | 06154111 | * | 6/1994 | A47K 1/02 |
| KR | 200467100 | * | 5/2013 | A61H 33/06 |
| WO | 2015151308 A1 | | 10/2015 | |

* cited by examiner

LAVATORY FOR A VEHICLE AS WELL AS A VEHICLE HAVING SUCH A LAVATORY

CROSS-REFERENCE TO PRIORITY APPLICATIONS

This application claims the benefit of, and priority to, German patent application number DE 102016120121.9, filed Oct. 21, 2016. The content of the referenced application is incorporated by reference herein.

TECHNICAL FIELD

Embodiments of the subject matter described herein relate generally to a lavatory for a vehicle as well as a vehicle having such a lavatory.

BACKGROUND

In vehicles for the transport of passengers often lavatories are installed, which usually comprise a toilet and a wash basin. For ensuring an as high efficiency as possible in utilizing the available installation space the installation size of various installations in a lavatory are limited. This particularly relates to the use in commercial aircraft. Besides the already rather highly limited standing area inside the lavatory inter alia the installation size of a wash basin positioned therein is very small and merely allows washing the hands. For this reason, the integration of additional shower and wash functions is often only reserved for luxuriously equipped passenger cabins.

In particular for preparing pilgrimages there may be a need for providing an apparatus for washing the feet. While feet could be washed in the wash basin of the lavatory, this may be cumbersome due to the limited size and the installation height.

German patent document DE 10 2014 110 808 A1 exemplarily shows a lavatory for an aircraft having a first wall with an access opening arranged therein, a door and an elongate flap. The door is arranged to be swivable relative to the access opening about a first rotational axis and connects to the flap, which is arranged to be swivable on a second rotational axis, which is arranged at a side of the access opening opposite to the first rotational axis and parallel to the first rotational axis. In a closed state the door and the elongate flap extend from the first rotational axis or the second rotational axis, respectively, to the second rotational axis or the first rotational axis, respectively and together close the access opening to a full extent.

BRIEF SUMMARY

Hence, there may be a need to propose a lavatory, which is able to provide a washing apparatus particularly in addition to the common functions of a lavatory, with which washing apparatus a user may comfortably wash the feet, wherein preferably the provided washing apparatus should not impair the efficient space utilization.

The need may be met by a lavatory having the features of the independent claim 1. Advantageous improvements are derivable from the dependent claims and the following description.

It is proposed a lavatory for a vehicle, which comprises a housing that is accessible through an access opening, as well as a washing apparatus for washing feet. The washing apparatus comprises a water supply device and a water removal device. The washing apparatus comprises a depression, with which the water removal device is couplable and which is positionable underneath the water supply device. The depression further comprises a use height, which is 700 mm at a maximum.

The housing of the lavatory is to be understood as an arrangement of one or several walls, which together define the shape of the lavatory. The walls preferably provide a closed or closable space, which is accessible through an access opening. The access opening may be created in a single or two walls that adjoin each other. The access opening is preferably closable through a one-piece or multi-piece door. The unit created by the housing and the components arranged therein may be referred to as toilet or lavatory monument. As an alternative, this unit may also be a part or module, respectively, of a larger, modularly created cabin monument with multiple functions.

The washing apparatus is a device, which particularly enables the washing of feet. For this purpose, it comprises a water supply device, a water removal device and a depression, which acts as basin or is designed as such. The water supply device allows the supply of water, while the water removal device allows the removal of used water.

Civil aircraft usually comprise a so-called "water/waste" system, which has a drinking water system, a waste water system and a toilet system. A so-called gray-water system may be provided, in which used water of all wash basins and sinks is centrally collected in the passenger cabin. It may be disposed of the aircraft through a drain mast also during flight. The water removal device may be connected to such an open gray water system and for this purpose utilizes respective discharge or suction ducts, respectively, which are also connected to a drain of the wash basin. As an alternative thereto the water removal device may be connected to a closed black water system, which is utilized particularly for disposal of waste water containing feces into respective waste water tanks. For this purpose, also further components may be required, such as a flush valve.

The supply of preferably all water consumers may be conducted from a central fresh water system. This may lead water in a pressurized manner or through pumps to the consumers. Preferably the water supply device of the washing apparatus is connected to the fresh water system. This may be realized through a branch duct at a supply duct to a water tap, which is associated with a wash basin in the lavatory. The water supply device may be designed as a common water tap. It is useful to design it to be operable without being touched. As an alternative thereto also an activation button may be provided, which is distanced from the water supply device.

It is useful to place the washing apparatus in the vicinity of a wash basin or water tap, respectively, in the lavatory. Thereby the devices used for the water tap or the drain of the wash basin, respectively, may be connected with the water supply device and the water removal device.

A depression of the washing apparatus constitutes a basin, which may be accessed by the user in the lavatory on demand. The depression is to be understood as a particularly surface-like indentation, which is capable to hold a certain water volume through protrusions or delimiting surfaces at least on rims. The depression may be realized in any way and may be designed trough-like and/or basin-like. The water removal device may be integrated into the depression, such as in the shape of one or multiple drainage openings. As an alternative thereto the water supply device may directly connect to the depression, without being integrated into the depression itself. Water may flow out of the depression into the water removal device as soon as a sufficient slope is present.

Finally, it is particularly advantageous if the depression comprises a certain size, which satisfies its assigned task. For washing feet, the depression should be designed in such a way that a user may place his foot onto it or into it, respectively. It may be useful to provide a width of 25 cm or more, as well as a depth of at least about 10 cm.

Due to the use height of the depression of 700 mm at a maximum, users having a statistically relevant body height standing on the floor of the lavatory are facilitated in putting their feet into the washing apparatus without further ado. Preferably the use height is 650 mm at a maximum. Particularly preferred the use height is 620 mm at a maximum. Furthermore, it is advantageous if the use height of the depression is at least 200 mm, since otherwise the user would have to bend quite strongly in order to wash his feet. It is preferred to provide a use height that is at least 300 mm. Particularly preferred the use height is at least 400 mm.

The depression is to be designed in a way that it is located underneath the water supply device or may be positioned there on demand. By this it is enabled to supply water directly onto the foot of the user.

To sum up a lavatory is provided, which allows the integration of a washing apparatus in an interior space of a lavatory, without impeding the compactness of the lavatory itself. For this it is intended to integrate the washing apparatus into the interior cladding of the lavatory in such a manner that the interior cladding is fully closable or at least in a region openable by at least one closure body. Particularly preferred the washing apparatus may be integrated in the vicinity of a water tap and a drain of a wash basin, in order to be able to use the connections of a water/waste system coupled therewith.

In an advantageous embodiment the washing apparatus comprises at least one closure body, which is movably supported on an interior wall of the lavatory or a component bordering it and is adapted for being moved into a stowage position and a use position, wherein the depression is at least partially covered when the closure body is in the stowage position and wherein the depression is freely accessible within the lavatory when the closure body is in the use position. The interior wall may thereby be created by an interior side of a wall of the housing. However, an interior wall may also be realized as a separate component, which is arranged at a wall or in a distance to a wall, which is part of a housing. It is conceivable to shape the interior equipment of the lavatory by functionally arranging interior walls and to clad auxiliary systems for the pieces of equipment in the lavatory. Exemplarily it is possible to provide a wash table, which projects from the interior wall into the interior of the lavatory and receives a wash basin. From the wash table, a further interior wall may extend in the direction of a floor surface of the housing downwardly. In an installation space underneath the wash basin function elements may be integrated, which are required for the water supply and waste water removal.

The at least one closure body may be a mechanical component, which is capable of covering the washing apparatus when it is not in use or to make it available when in use, respectively. For this, the at least one closure body is arranged to be movable at the at least one interior wall or a neighboring component, such that it is bringable into two different mechanical states by moving it. In a first state, which corresponds to the stowage position, the at least one closure body creates a homogenous surface with neighboring components, which inter alia include the at least one interior cladding, a wash table or similar. In this case, the washing apparatus is preferably fully covered.

In a second mechanical state, which corresponds to the use state, the closure body allows a use of the washing apparatus. This may preferably be conducted through releasing an opening or a recess on or at the at least one interior cladding, into which the washing apparatus is integrated.

It is not significant how the at least one closure body is supported or movable, respectively, as long as it may reliably assume both states. A motion may include folding, pushing, turning, rolling and the like. Besides simple linear or purely rotational motions also more complex motion sequences may be made. For a support simple hinges, guides, telescopic slide-outs, multi joint structures, cam mechanisms and other kinematics, which allow for a space saving support. Further, the at least one closure body is not necessarily a single closure body, but may also be realized in form of two or more closure bodies. A single closure body may furthermore also be a combination of multiple components, for example lamellae movably attached to each other. With this, also more complex motions for opening or closing may be conducted.

In an advantageous embodiment the depression extends through at least one interior wall from an interior space of the lavatory outwards at least in a region. Hence, the depression extends into an installation space of the lavatory, which is usually not accessible for the user. Through moving the at least one closure body into a use state the user is enabled to access an otherwise partially unused region of the lavatory for integration of a depression or a basin created thereby, respectively. In particular, with a combination of a wash table and a washing apparatus according to an embodiment of the invention, it is particularly advantageous if the depression at least occupies a part of the installation space underneath the wash table that is usable thereby, such that the realizable size of the depression in the interior of the lavatory may be maximized without lowering the comfort.

In a preferred embodiment, the depression at least partially projects from an interior wall into the interior of the lavatory with the closure body in the use position. Hence, the depression is easily accessible for the user and the space in the interior of the lavatory may be reconfigured on demand through moving the at least one closure body. In this constellation, the depression may project into a region of the interior space, which is otherwise used for other purposes.

In a particularly preferred embodiment the depression is designed for being moved to a region directly above a toilet unit for adapting the use position. Consequently, the depression, or the basin created thereby, respectively, is easily accessible from a standing surface in front of a toilet unit in the lavatory. The toilet unit is to be understood as a toilet having a toilet bowl and optionally a lid. As the toilet unit is usually usable from a standing surface in front of the toilet unit, the positioning of the depression into the region used by the toilet unit is very ergonomic.

In an advantageous embodiment the at least one closure body includes at least one closure flap, which is swivably supported at the at least one interior wall and which is swivable between a substantially horizontal position and a substantially vertical position. The use of such a closure flap may be mechanically particularly simple by inserting a hinge. Depending on the possible position and orientation of the hinge or swivel axis a relatively large closure flap may be realized. It is conceivable that exemplarily in a use state the closure flap is positioned only insignificantly above a toilet. The swivel axis may be arranged at an end of the closure flap, such that in the use position the closure flap is fully swivable around an end. The swivel axis may exemplarily be realized through a hinge at the at least one interior wall. As an alternative thereto the hinge axis may be arranged between two ends of the closure flap, such that the closure flap may partially be moved from the interior cladding outwardly, depending on the position of the hinge axis. The realizable size of the closure flap is thereby increased. In particular, this may be helpful when utilizing the closure flap for integrating the depression, as stated in the following, since it may thereby be shaped larger. It is evident that also multiple closure flaps are applicable, which complement each other. Of course, a swiveling may also be achieved by means, which do not conduct a purely rotational movement, but also other movement patterns. For this, instead of a single hinge also more complex kinematics or guides, respectively, are conceivable.

In a preferred embodiment, the closure flap is integrated in an interior cladding in a region neighboring a wash basin. Particularly preferred the closure flap is arranged at an interior wall, which is positioned next to a toilet unit in seating direction. Thereby the installation space arranged above the toilet unit may be occupied by the closure flap. A user may relatively comfortably stand in front of the toilet unit, in order to exemplarily wash his feet in a depression, which is created in the closure flap.

In this manner, it is particularly advantageous if the depression is created in a closure flap. By swiveling the closure flap back from a horizontal use position the depression is particularly urged into a vertical stowage position, in order to close the interior cladding again. Residual water, which is still present in the depression, may be drained through the slope created during the swiveling. For this a connection region at a swiveling region of the closure flap is designed accordingly, in order to ensure the smooth water removal without leakage of water.

A further closure flap may be provided, which is integrated into a wash table above the washing apparatus. This may be equipped with a swivel axis, which is arranged at a rear end of the wash table. This additional closure flap thus allows to assume a horizontal stowage position, in which an upper section of the washing apparatus is covered. In a substantially vertical use position this additional closure flap thus follows the upper section of the washing apparatus.

In an alternative embodiment, the depression is completely arranged in a region, which from at least one interior wall faces away from the interior space of the lavatory. This is recommended particularly with claddings underneath a wash table, for example adjacent to a wash basin, wherein a part of the wash table constitutes a closure body. This may exemplarily be swiveled vertically upwards around a swivel axis arranged at an outer wall, such that the depression positioned underneath as well as particularly water supply devices and water removal devices are released.

With this embodiment, it may be advantageous to utilize a closure body, which is vertically slidably supported at the at least one interior wall.

This may furthermore be supplemented by a closure flap, which constitutes a part of the wash table.

The depression is preferably arranged in a manner that it comprises a use height, which is in a range of 450 mm to 650 mm. Thereby, a use through a person is possible without further ado. The tolerable use height is determined according to various norms, in which the body measures of humans are classified. These are based on anthropometric studies, with which the fifth and the ninety-fifth percentile as statistical extremums are determined. These mean that only 5% (5. percentile) are smaller than assumed, or 5% are taller than assumed (95. percentile), respectively.

Further advantageously the lavatory may comprise a splash guard, which is positionable into a stowage position and a use position.

In a further embodiment, the washing apparatus may also be integrated in a lid of a toilet unit. Hereby the structure of a lid of a toilet unit would be raised in comparison with conventional toilet units. The water removal unit may be realized in form of a drain, which leads waste water into a toilet bowl of the toilet unit. For a conventional use of the toilet unit the washing apparatus, which exemplarily constitutes the lid of the toilet unit, is swiveled open just as conventional lids, and folded back onto a wall arranged behind the toilet unit. A sufficient sealing of the washing apparatus for preventing the leakage of residual waste water with folded up lid is to be ensured.

Embodiments of the invention further relate to a vehicle having a passenger cabin and at least one lavatory according to the above description arranged therein. The vehicle may particularly be an aircraft, with which an efficient space utilization is an elementary requirement during the design.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and application options are disclosed in the following description of the exemplary embodiments in the figures. All the described and/or illustrated characteristics per se and in any combination form the subject matter presented here, even irrespective of their composition in the individual claims or their interrelationships. Furthermore, identical or similar components in the figures have the same reference characters.

Finally.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
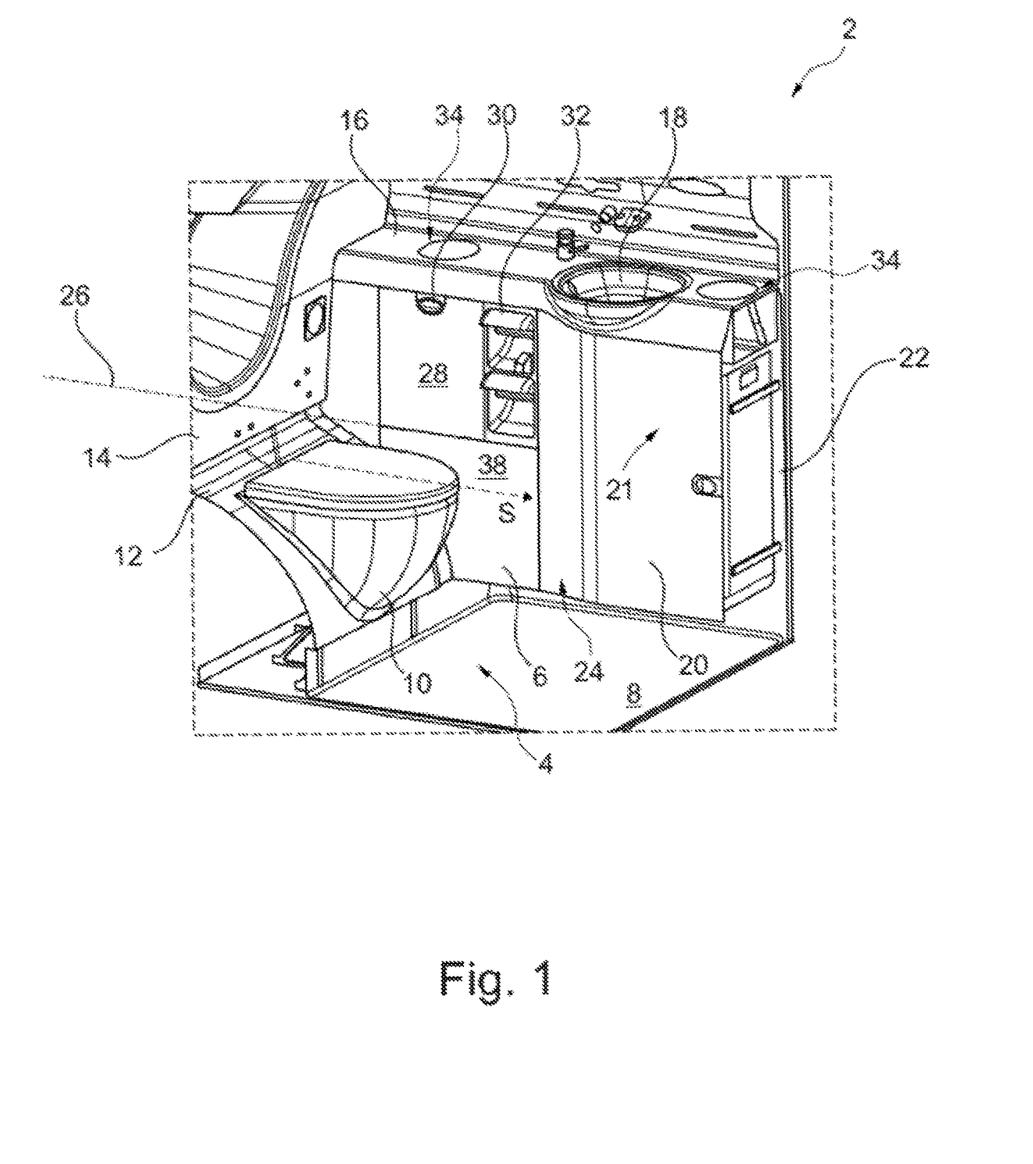
FIG. 1 shows a lavatory without a washing apparatus of the type disclosed herein.

FIG. 1 shows a conventional lavatory 2 with a toilet unit 4 arranged therein, a housing wall 22, a first interior or table wall 6, and a floor surface 8. The toilet unit 4 comprises a toilet bowl 10 and a cladding 12, which connects to a rear second interior wall 14. The housing wall 22 and the table wall 6 extend from the second interior wall 14 substantially parallel to a seating direction S of the toilet unit 4.

A wash table 16 is arranged above the table wall 6 and from the second interior wall 14 extends horizontally above the table wall 6 to the housing wall 22, i.e., parallel to the floor surface 8. A wash basin 18 connects thereto, which comprises a greater construction depth than the wash table 16. Underneath this a basin portion 20 of the table wall 6 extends at a slightly larger distance from the housing wall 22 than a non-basin portion 38 of the table wall 6. Between the non-basin portion 38 of the table wall 6 and the basin portion 20 of the table wall 6 a transition 24 is present, which is evenly curved. As shown, an internal table space 21 is defined under the wash table 16 and between the housing wall 22 and the table wall 6.

In the table wall 6, closure flap 28 is arranged, which is arranged to be swivable around a horizontal hinge line 26. Behind this a waste bin may be present, which may be emptied through the closure flap 28. The closure flap 28 constitutes a part of the table wall 6, which contributes to a harmonic design of the complete interior cladding. At an upper end of the closure flap 28 a handle 30 is arranged, with which the closure flap 28 may be opened or pulled open, respectively, such that it is swiveled about the hinge axis 26.

Two toilet paper dispensers 32 are arranged one above the other between the transition 24 and the closure flap 28. Above the closure flap 24 and inside the wash table 16 openings 34 are arranged, which lead to waste bins not shown herein.

In the following figures, the integration of a washing apparatus particularly for washing the feet is illustrated.

Figure 2:
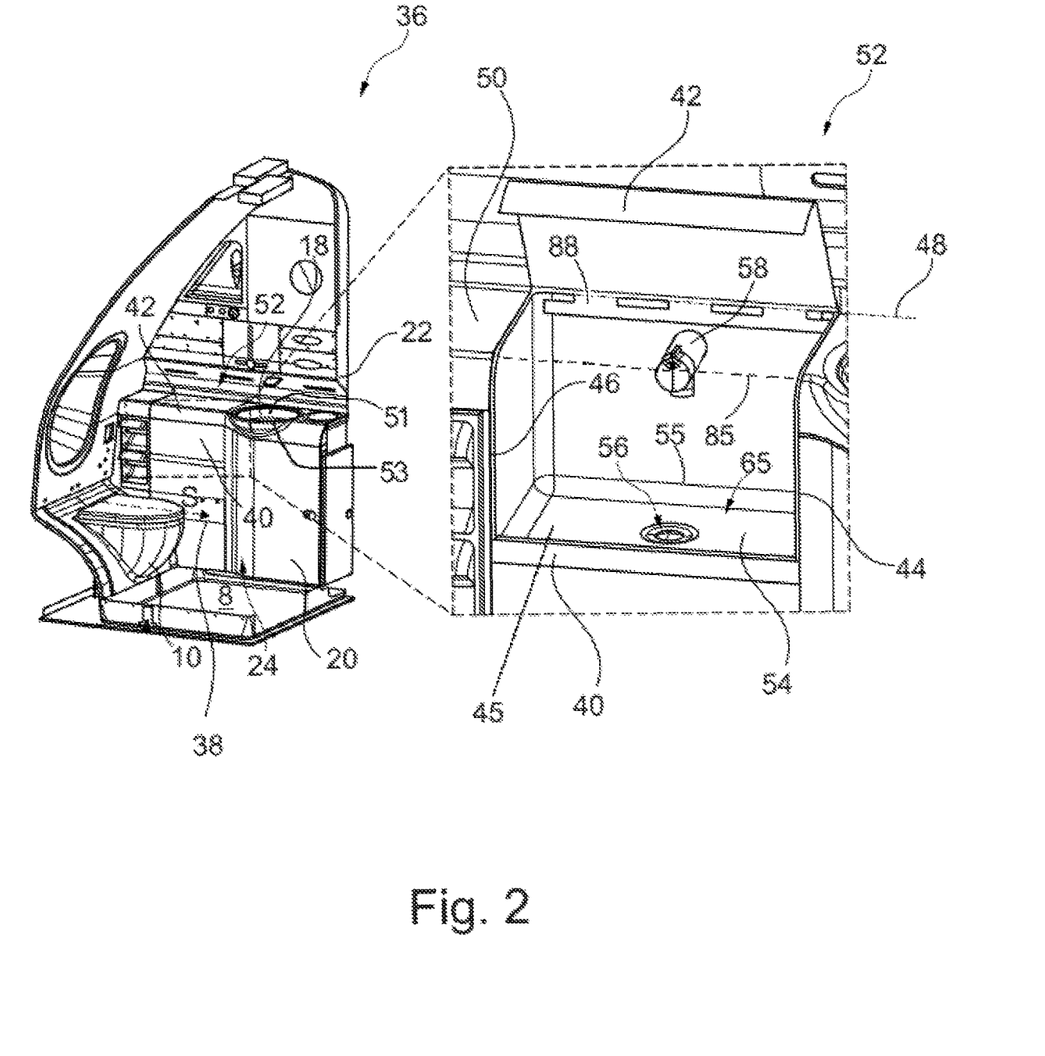
FIGS. 2 and 3 show a first exemplary embodiment of the washing apparatus according to the invention.

FIG. 2 exemplarily shows a lavatory 36 according to certain embodiments of the invention, which is very similar to the lavatory 2 of FIG. 1 or is based on it, respectively. The differences lie in the design of the non-basin portion 38 of the table wall and the overlying portion of the wash table 16 exemplarily in the left part in this figure. Here, the non-basin portion 38 is shown as being formed with a first or lower closure body 40, and the wash table 16 is shown as being formed with a second or upper closure body 42. The first closure body 40 is realized as a sliding panel, which is guided in the vertical direction at two distanced vertical edges 44 and 46. As shown, the two vertical edges 44 and 46 define a lower access opening 45 terminating at an interface 85, and the lower access opening 45 is closed by the lower closure body 40. The second closure body 42 is realized as a closure flap, which is swivably mounted about a hinge axis 48. The hinge axis 48 is arranged at an end of the wash table 50 that is distanced from the first wall 38. As shown, an upper access opening 88 is defined between the hinge axis 48 and the interface 85 and is closed by the upper closure body 42. Further, it may be seen that the wash basin 18 is formed in the wash table 16 with an upper edge 51 circumscribing a wash basin opening 53.

In the left illustration of FIG. 2 the lavatory 36 is shown in a neutral state. Here, a completely closed interior cladding is shown, which corresponds to the illustration in FIG. 1 except the position of the toilet paper dispenser 32 and the lack of the left opening 34. In the magnified illustration in the right part of FIG. 2 a washing apparatus 52 is recognizable. This exemplarily comprises a basin-like depression 54, which extends from an interior side of the non-basin portion 38 of the table wall 6 toward the housing wall 22. The depression 54 has an upper edge 55 defining a depression opening 65. At a bottom of the depression 54 a water removal device 56 in form of a drain is shown. A waste water line may be coupled with it, which is connected to a drain of the wash basin 18. At a rear end of the washing apparatus 52 a water supply device 58 in form of a water tap is shown. At a rear end of the washing apparatus 52 a water supply device 58 in form of a water tap is shown. This may be connected to a water duct, which supplies water to a water tap associated with the wash basin 18.

Consequently, the washing apparatus 52 allows a user to alternatingly put his feet into the washing apparatus 52 standing in front of the toilet unit 4 and to exemplarily put them at least partially onto the depression 54 and to wash them. The interior design of the lavatory 36 is almost identical to the interior design of the lavatory 2 in FIG. 1, the comfort perception for a user on the toilet unit is absolutely not reduced.

Figure 3:
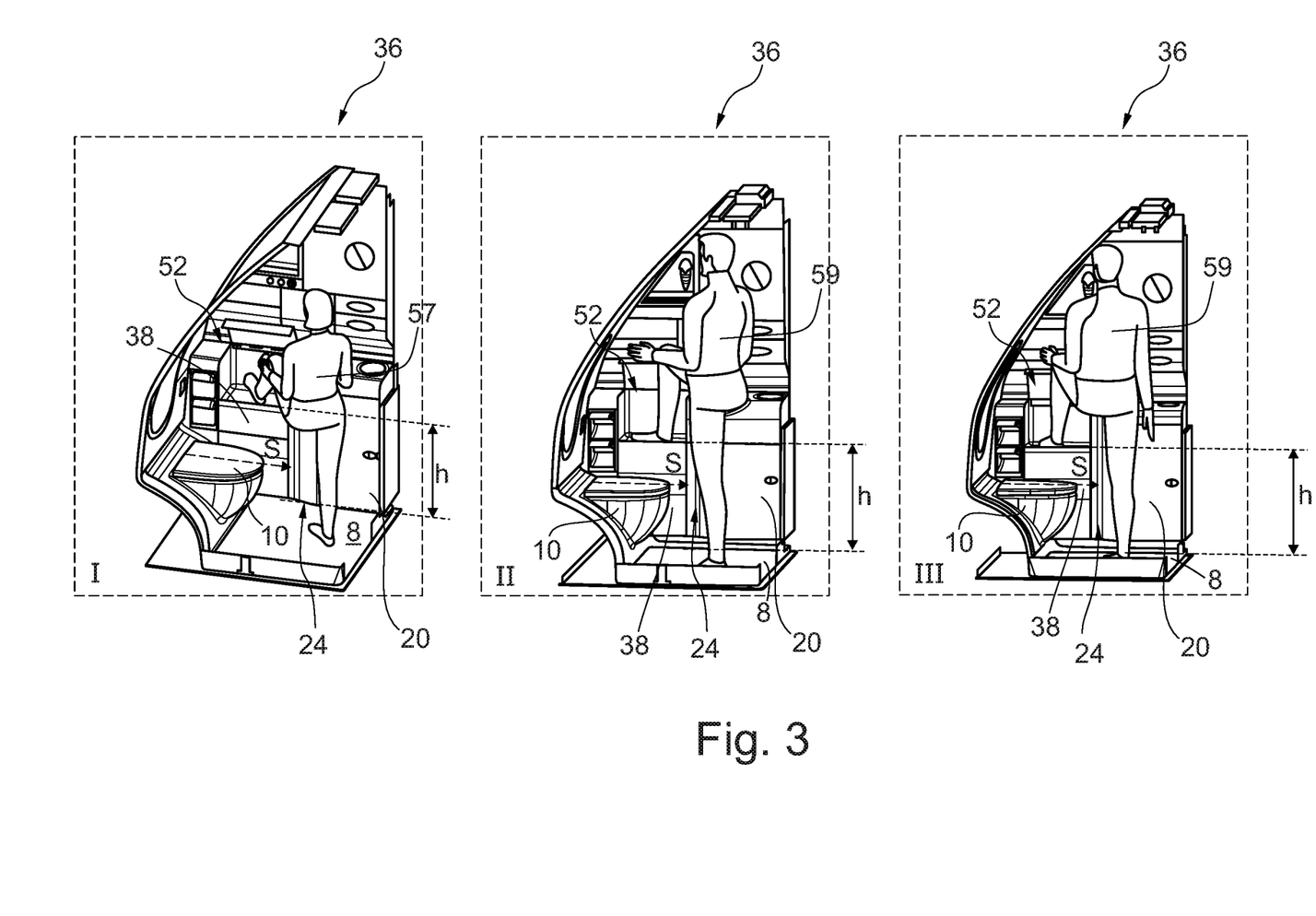

As shown in FIG. 3 a height h of the depression 54 of approximately 620 mm above the floor 8 may be accomplished with this arrangement. Partial figure I shows the use of the washing apparatus 52 by a female user 57 with a relatively low height (model: 5%). The partial figures II and III show a male user 59 having a relatively large height (model: 95%) during washing of the right foot (partial figure II) and of the left foot (partial figure III). This height is acceptable. However, provision may also be made for stepup means, exemplarily for being folded out from the basin portion 20 of the table wall 6.

Figure 4:
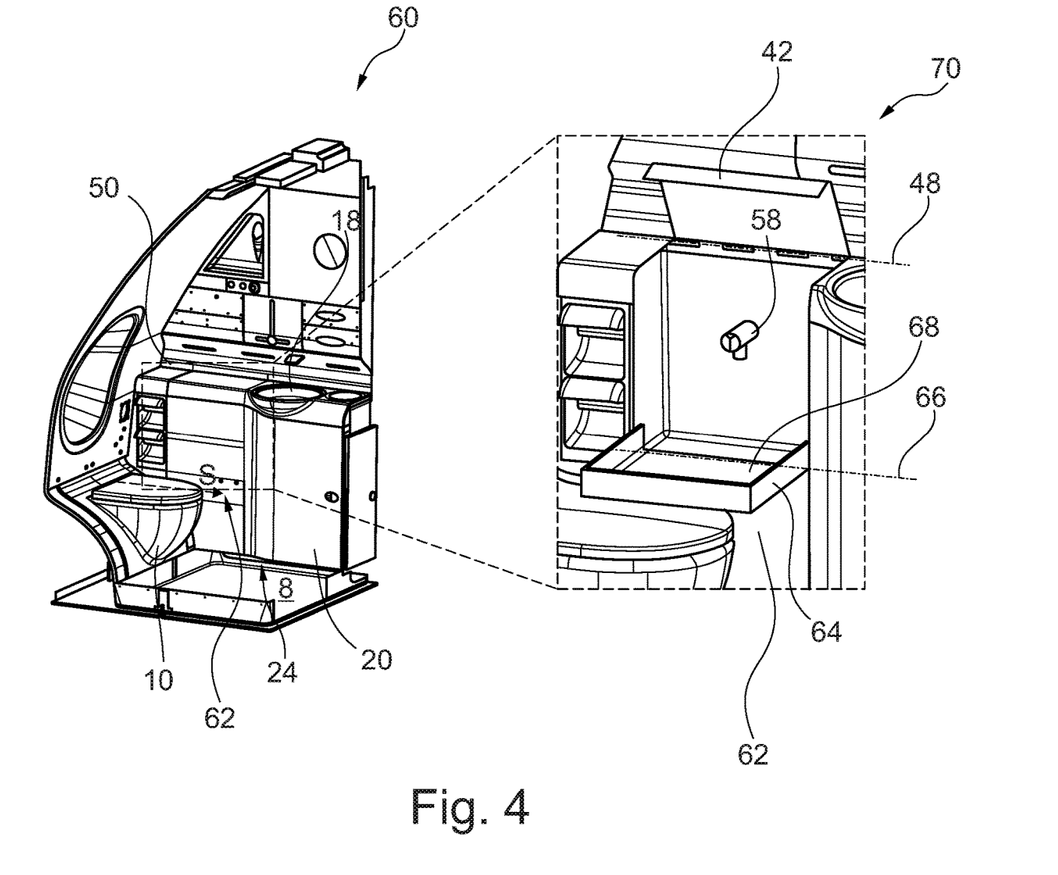
FIGS. 4 and 5 show a second exemplary embodiment of a lavatory according to the invention.

An alternative variant in form of a lavatory 60 is shown in FIG. 4. Here, a first interior wall 62 is provided, which carries a first closure body in form of a closure flap 64 and supports it so as to be swivable about a hinge axis 66. Thus, the closure flap 64 may be swiveled from a vertical stowage position (see left illustration) into a substantially horizontal use position. Thereby, the closure flap 64 clearly projects into the interior of the lavatory 60.

A depression 68 is created at an interior side of the closure flap 64, which depression 68 replaces the depression 54 of FIG. 2. It is conceivable to provide a flexible, web-shaped sealing element at an end of the closure flap 64 facing the interior wall, which sealing element is fastened both at the end of the closure flap 64 as well as at a structurally fixed component at a side of the interior wall facing away from the interior space of the lavatory. A water removal device may connect thereto. The sealing element may compensate the variable orientation of the closure flap 64 and provide a sufficient sealing. Of course, other multi-part and noncontinuous sealing elements are conceivable.

In addition, a further closure flap 42 borders the wash table 50, which closure flap 42 corresponds to the closure flap 42 of FIG. 2. It is swivably mounted on the hinge axis 48.

From this a washing apparatus 70 follows, which is more comfortably accessible for a user than the washing apparatus 52 of FIG. 2.

Figure 5:
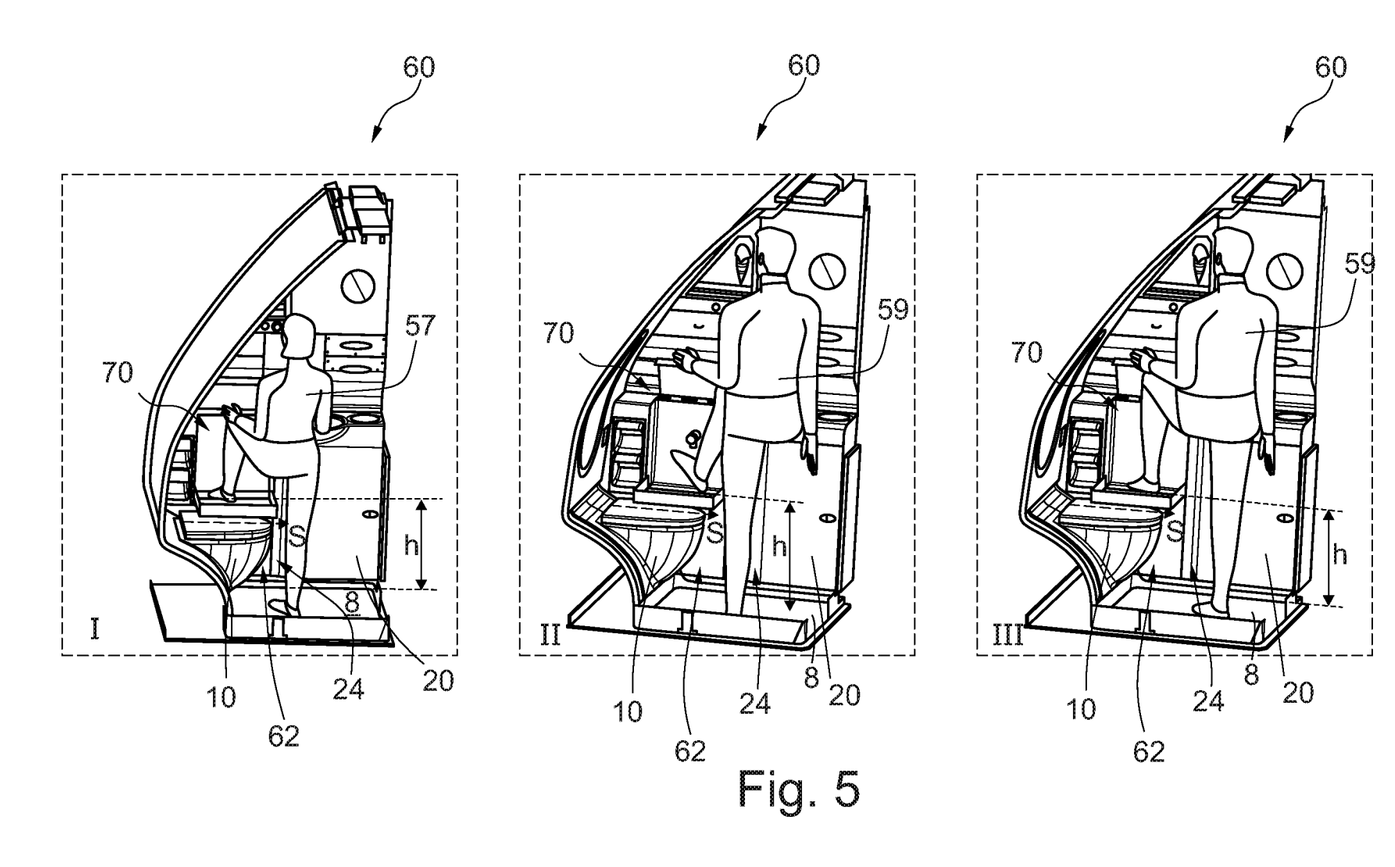

In FIG. 5 the use of the washing apparatus 70 is shown in three partial figures I to III. Partial figure I again shows a female user 57 according to the 5% model, the partial figures II and III each show a male user 59 according to the 95% model. Through using a closure flap 64 a height h to the depression 68 of slightly above 50 cm may be achieved, which is particularly convenient for users with smaller height.

Figure 6:
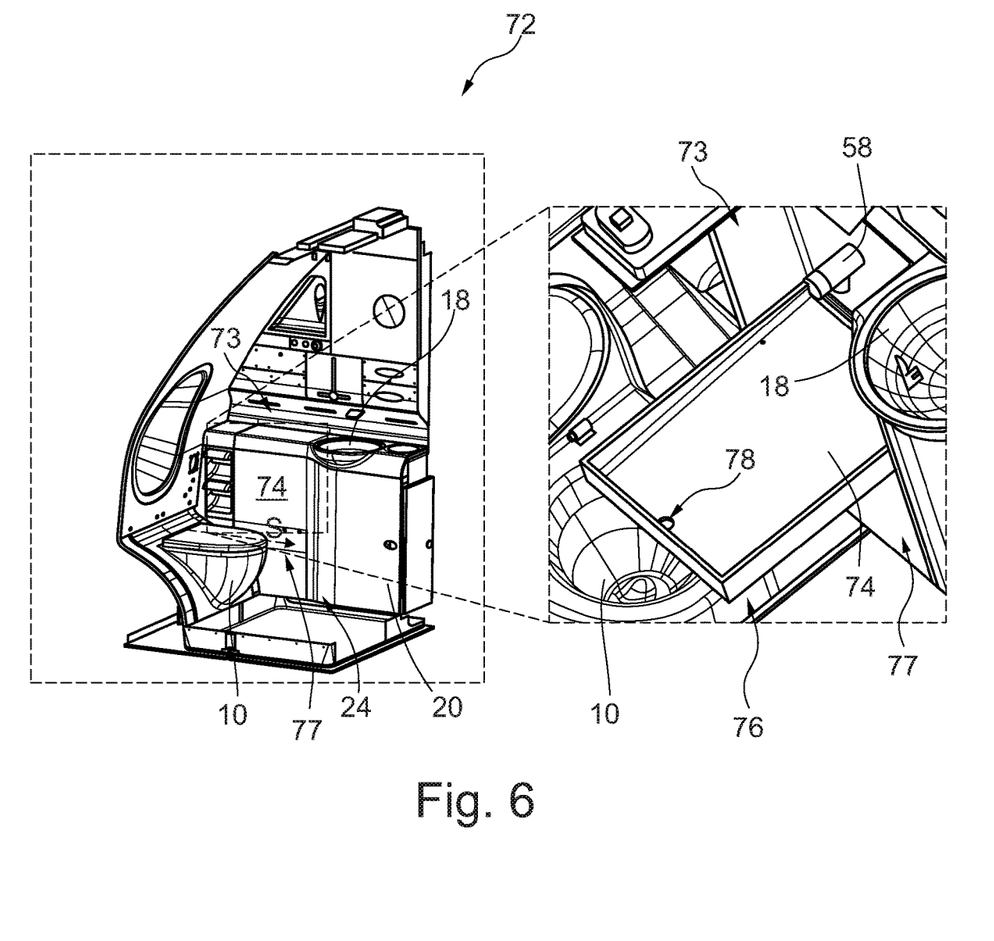
FIGS. 6 and 7 show a third exemplary embodiment of a lavatory according to the invention.

In FIG. 6 a lavatory 72 having a washing apparatus 73 is shown, which substantially corresponds to the washing apparatus 70, but is equipped with a modified closure flap 74. This comprises a drain opening 78 as a water removal device at an end 76, which faces away from an interior wall 77 of the lavatory 72. It is positioned in a way that waste water reaches a toilet bowl 10, which in a use state is positioned underneath, and is removed there. For ensuring a splash-free use the closure flap 74 may be designed in such a manner that it comprises a particularly low height from the floor surface 8, which is still slightly lower than in the lavatory 70. The height h may exemplarily be less than 500 mm and may measure about 475 mm in the shown example.

Figure 7:
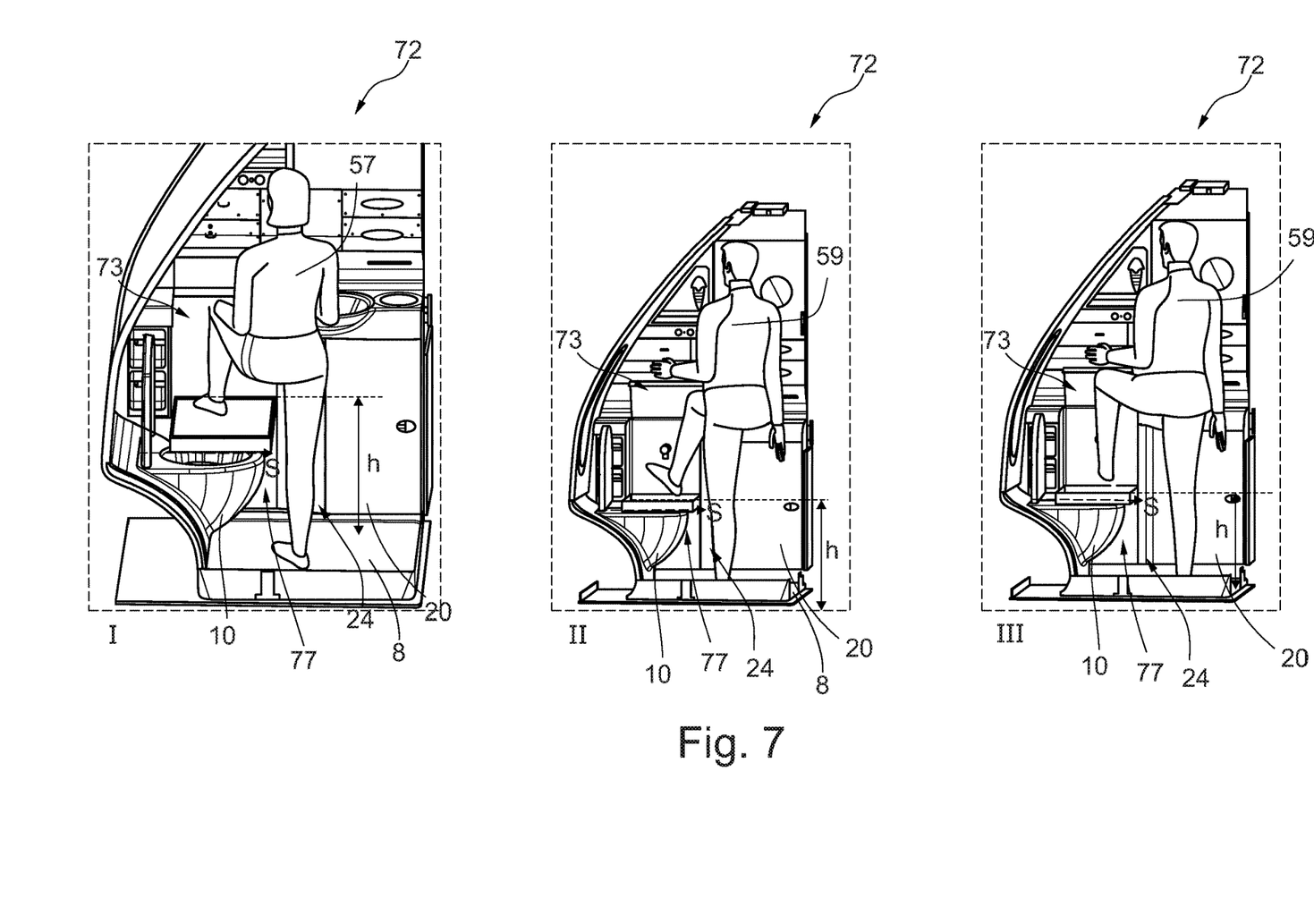

FIG. 7 also shows the lavatory 70 in three partial figures I to III, which show the use of the washing apparatus 72. Partial figure I again shows a female user 57 corresponding to the 5% model, the partial figures II and III each show a male user 59 corresponding to the 95% model.

Figure 8A:
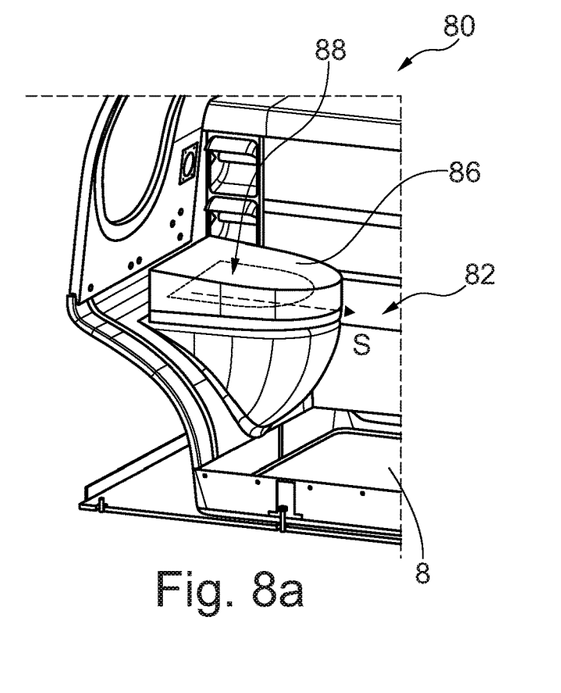
FIGS. 8a and 8b show a fourth exemplary embodiment of a lavatory according to the invention.
Figure 8B:
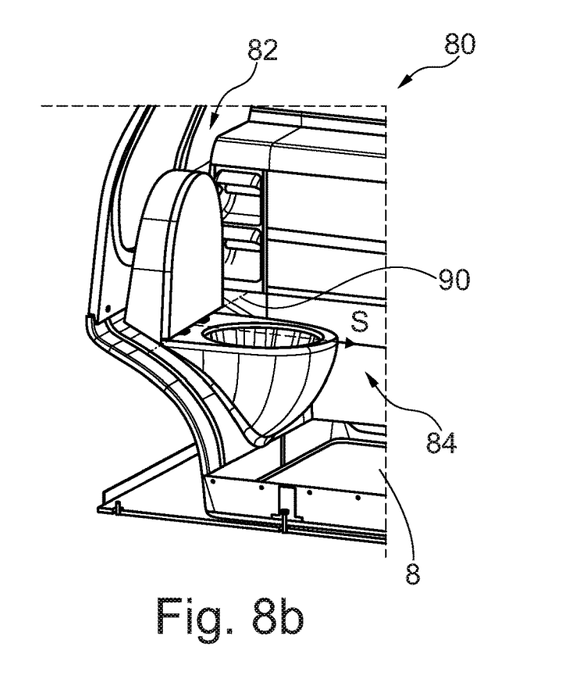

FIGS. 8a and 8b show a modified lavatory 80, which comprises a washing apparatus 82 that is integrated into a toilet unit 84. The washing apparatus 82 comprises a depression 88, which is closable through a lid 86, wherein waste water directly reaches the toilet unit 84. A water supply device may be installed at a rear end (not shown). FIG. 8a shows the washing apparatus 82 in a closed state. FIG. 8b shows the toilet unit 84, at which the washing apparatus 82 is swiveled upwardly about a horizontal swivel axis 90, such that the toilet unit 84 may be used.

Figure 9:
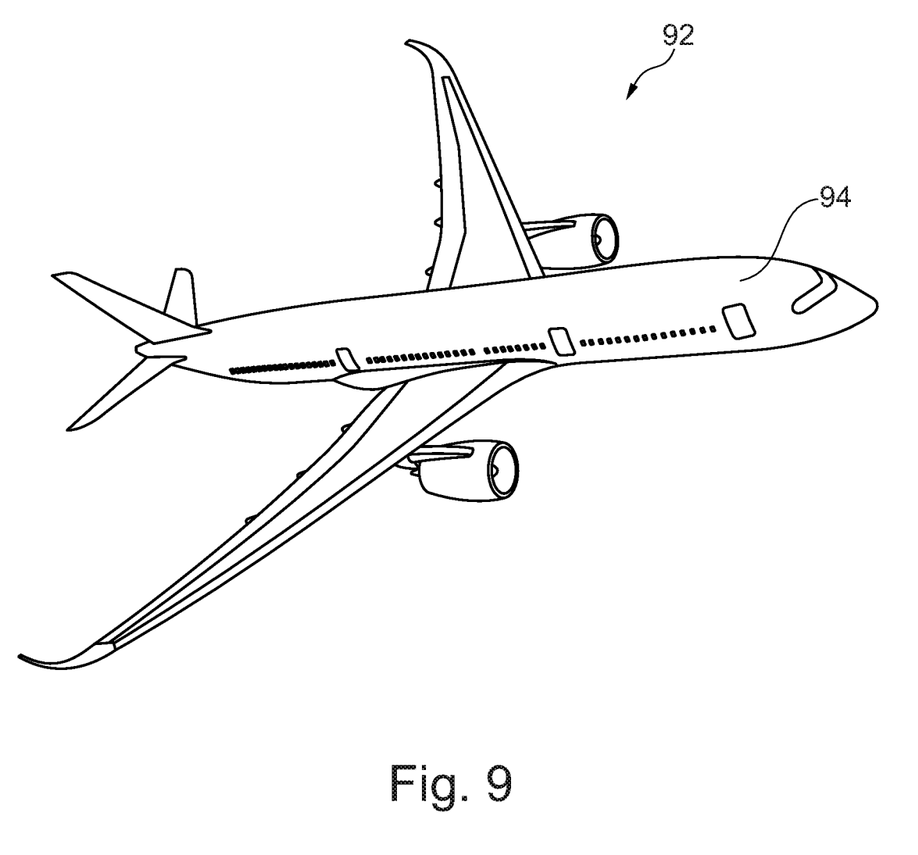
FIG. 9 shows an aircraft having a passenger cabin created therein and at least one such lavatory.

Finally, FIG. 9 shows an aircraft 92, which comprises a passenger cabin 94 created therein having one or multiple such lavatories.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An aircraft comprising:
a passenger cabin; and
a lavatory arranged in the passenger cabin, the lavatory comprising:
a floor and an interior wall arrangement, including a table wall, defining a lavatory space and including an opening to the lavatory space;
a wash table having an upper surface, wherein the table wall extends downward from the wash table to the floor;
a wash basin formed in the upper surface of the wash table, wherein an internal table space is defined under the wash table and under the wash basin and is separated from the lavatory space by the table wall;
wherein the table wall is formed with a lower access opening;
wherein the upper surface of the wash table is formed with an upper access opening to the internal table space in communication with the lower access opening; and
a washing apparatus located in the internal table space for washing feet;
wherein the washing apparatus comprises a water supply device and a water removal device; and
wherein the washing apparatus comprises a depression, with which the water removal device is couplable and which is positionable underneath the water supply device.

2. The aircraft of claim 1 wherein:
the wash basin has an upper edge circumscribing a wash basin opening;
the depression of the washing apparatus has an upper edge defining a depression opening; and
the lower access opening formed in the table wall is located above the depression opening and below the wash basin opening.

3. The aircraft of claim 1 wherein the wash basin is located at a first height over the floor, wherein the washing apparatus is located at a second height over the floor lower than the first height, and wherein the wash basin is laterally distanced from the washing apparatus.

4. The aircraft of claim 1 wherein the lavatory further comprises a lower closure body having a closed configuration in which the lower closure body completely closes the lower access opening and an open configuration in which the lower closure body lies below the lower access opening.

5. The aircraft of claim 1 wherein the lavatory further comprises:
a lower closure body having a closed configuration in which the lower closure body completely closes the lower access opening and an open configuration in which the lower closure body lies below the lower access opening; and
an upper closure body having a closed configuration in which the upper closure body completely closes the upper access opening and an open configuration.

6. The aircraft of claim 1 wherein the lavatory further comprises:
a lower closure body having a closed configuration in which the lower closure body completely closes the lower access opening and is flush with the table wall; and
an upper closure body having a closed configuration in which the upper closure body completely closes the upper access opening and is flush with the upper surface of the wash table.

7. The aircraft of claim 1 wherein the wash basin is located at a first height over the floor, and wherein the lavatory further comprises:
a lower closure body having a closed configuration in which the lower closure body blocks the lower access opening; and
an upper closure body having a closed configuration in which the upper closure body blocks the upper access opening and an open configuration, wherein the upper closure body is rotatably connected to the table about a hinge axis, wherein a front edge of the upper closure body is located at an opened height over the floor when the upper closure body is in the open configuration, wherein the opened height is greater than the first height.

8. The aircraft of claim 1 further comprising a rear wall located under the wash table, wherein the internal table space is located between the table wall and the rear wall, and wherein the water supply device extends through the rear wall at a location above the depression.

9. A lavatory for a vehicle, the lavatory comprising:
a floor and an interior wall arrangement, including a table wall, defining a lavatory space and including an opening to the lavatory space;
a wash table having an upper surface, wherein the table wall extends downward from the wash table to the floor;
a first wash basin formed in the upper surface of wash table, wherein an internal table space is defined under the wash table and is separated from the lavatory space by the table wall; and
a second wash basin located in the internal table space laterally distanced from the first wash basin at a fixed position relative to the first wash basin.

10. The lavatory of claim 9 wherein the first wash basin is located at a first height over the floor, and wherein the second wash basin is located at a second height over the floor lower than the first height.

11. The lavatory of claim 10 wherein an upper access opening is formed in the wash table, and wherein a lower access opening is formed in the table wall in communication with the upper access opening for providing communication between the lavatory space and the internal table space to allow access to the second wash basin.

12. A lavatory for a vehicle, the lavatory comprising:
a floor and an interior wall arrangement, including a table wall, defining a lavatory space and including an opening to the lavatory space;
a wash table having an upper surface, wherein an upper access opening is formed in the wash table, wherein the table wall extends downward from the wash table to the floor;
a first wash basin formed in the upper surface of wash table, wherein an internal table space is defined under the wash table and under the wash basin and is separated from the lavatory space by the table wall;
a second wash basin located in the internal table space, wherein a lower access opening is formed in the table wall in communication with the upper access opening for providing communication between the lavatory space and the internal table space to allow access to the second wash basin; and
a lower closure body having a closed configuration in which the lower closure body closes the lower access opening and an open configuration in which the lower closure body lies below the lower access opening.

13. The lavatory of claim 12 further comprising an upper closure body having a closed configuration in which the upper closure body closes the upper access opening and an open configuration.

14. The lavatory of claim 13 wherein:
the lower access opening and the table wall are in a vertical plane perpendicular to the floor; and
the upper access opening and the upper surface of the wash table are in a horizontal plane parallel to the floor.

15. The lavatory of claim 14 wherein the lower closure body is flush with the table wall in the closed configuration; and the upper closure body is flush with the upper surface of the wash table in the closed configuration.

16. The lavatory of claim 15 wherein:
the first wash basin is located at a first height over the floor;
the second wash basin is located at a second height over the floor lower than the first height;
the upper closure body is rotatably connected to the wash table about a hinge axis located in the horizontal plane;
a front edge of the upper closure body is located at a third height over the floor when the upper closure body is in the open configuration; and
the third height is greater than the first height.

17. The lavatory of claim 16 further comprising;
a rear wall located under the wash table, wherein the internal table space is located between the table wall and the rear wall;
a washing apparatus located in the internal table space and including a water supply device located above the second wash basin and a water removal device located below the second wash basin, wherein the water supply device extends through the rear wall at a location above the second wash basin.

* * * * *